United States Patent
Cho

(10) Patent No.: US 7,450,517 B2
(45) Date of Patent: Nov. 11, 2008

(54) MOBILE AD HOC NETWORK SYSTEM AND OPERATING METHOD THEREOF

(75) Inventor: Ki-Hyoung Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 660 days.

(21) Appl. No.: 11/040,059

(22) Filed: Jan. 20, 2005

(65) Prior Publication Data

US 2005/0157661 A1 Jul. 21, 2005

(30) Foreign Application Priority Data

Feb. 11, 2004 (KR) .................. 10-2004-0009116

(51) Int. Cl.
*H04Q 7/24* (2006.01)
*H04L 12/26* (2006.01)
*H04L 12/28* (2006.01)

(52) U.S. Cl. .............. 370/238; 370/254; 370/338; 455/435.1; 455/445

(58) Field of Classification Search .......... 370/238, 370/254, 338; 455/435.1, 445
See application file for complete search history.

(56) References Cited

U.S. PATENT DOCUMENTS

| | | | |
|---|---|---|---|
| 5,987,011 A * | 11/1999 | Toh ............................ 370/331 |
| 6,092,117 A | 7/2000 | Gladwin et al. |
| 6,307,843 B1 * | 10/2001 | Okanoue ...................... 370/312 |
| 6,415,330 B1 | 7/2002 | Okanoue |
| 6,484,211 B2 | 11/2002 | Turunen |
| 6,512,935 B1 | 1/2003 | Redi |
| 6,728,232 B2 * | 4/2004 | Hasty et al. ................. 370/338 |
| 6,879,574 B2 * | 4/2005 | Naghian et al. ............. 370/338 |
| 6,920,171 B2 * | 7/2005 | Souissi et al. ............... 375/133 |
| 6,961,575 B2 * | 11/2005 | Stanforth .................... 455/445 |
| 7,031,288 B2 * | 4/2006 | Ogier ........................ 370/338 |
| 7,072,650 B2 * | 7/2006 | Stanforth ................. 455/426.2 |
| 7,092,391 B2 * | 8/2006 | Umeda ....................... 370/392 |
| 7,177,295 B1 * | 2/2007 | Sholander et al. .......... 370/338 |
| 7,281,057 B2 * | 10/2007 | Cain ......................... 709/238 |
| 2002/0015402 A1 | 2/2002 | Hughes et al. |
| 2002/0036982 A1 * | 3/2002 | Chen ......................... 370/230 |
| 2003/0179742 A1 * | 9/2003 | Ogier et al. ................. 370/351 |
| 2004/0010736 A1 | 1/2004 | Alapuranen |
| 2005/0111422 A1 * | 5/2005 | Nakanishi et al. ........... 370/338 |
| 2005/0144318 A1 * | 6/2005 | Chang ........................ 709/245 |
| 2007/0263628 A1 * | 11/2007 | Axelsson et al. ............ 370/392 |

OTHER PUBLICATIONS

The Handbook of Ad Hoc Wireless Networks / edited by Mohammad Ilyas. (Library of Congress Cataloging-in-Publication Data); p. 22-6; XP-000863867. 1953-II. Series.

* cited by examiner

*Primary Examiner*—Alpus H Hsu
(74) *Attorney, Agent, or Firm*—Lee, Hong, Degerman, Kang & Waimey

(57) ABSTRACT

A mobile ad-hoc network system includes: a plurality of mobile terminals; and a central control means for setting an optimal route among terminals, performing connection with an infrastructure network and connecting networks using different wireless access technologies. By including the central control means, the ad-hoc network system can overcome the limitation of the related art ad-hoc network and provide a network service with high quality and stability to each terminal.

15 Claims, 7 Drawing Sheets

MOBILE AD HOC NETWORK SYSTEM AND OPERATING METHOD THEREOF

BACKGROUND OF THE INVENTION

1. Field of the Invention

The present invention relates to a wireless network system and, more particularly to a mobile ad-hoc network system.

2. Description of the Related Art

A mobile ad-hoc network is a temporary network autonomously formed by terminals with mobility by using an air interface and stands alone from an infrastructure network.

The mobile ad-hoc network has been developed to temporarily form a network in an area where an infrastructure network does not exist or development of a network is not easy based on the infrastructure network. Initially, research on the ad-hoc network was conducted for a military purpose, and recently, its application is being extended to various fields of a real life such as a PAN (Personal Area Network).

The ad-hoc network operating with only connected terminals without the help of the infrastructure has many problems such as limited battery capacity of terminals, disconnection of a network connection due to movement of terminals, security, charging, and so on, and in order to solve such problems, various researches are being conducted centering on a MANET (Mobile Ad hoc NETwork) WG of an Internet Engineering Task Force (IETF).

Major application fields of the mobile ad-hoc network can include the construction of a temporary network for an emergency service.

Since the mobile ad-hoc network does not require the infrastructure network, it can be applied for an area where using of communication infrastructure is not available, an area where communication infrastructure does not exist such as a desert or a mountainous area, or an area where installation of the communication infrastructure is not easy. Namely, the ad-hoc network can be temporarily constructed for use in a rescue operation or the like.

In addition, the mobile ad-hoc network can be also applied for a case where information is promptly shared or exchanged between persons in a convention hall or in an exhibition hall. Through the ad-hoc network, in small, two persons can exchange an electronic name card, and in large, a rapid contribution can be made among every participant in a standardization conference or broadcasting of information on products can be made in an exhibition, and so on.

Military application is recognized as one of the most usable application fields of the mobile ad-hoc network. Namely, the mobile ad-hoc network can be used for communication among soldiers and between soldiers and military equipments in a battle field where the communication infrastructure can be hardly used.

WPAN (Wireless Personal Area Network) and home networking are recently introduced application fields of the mobile ad-hoc network. In constructing the PAN, a small-scale network among information communication devices such as PDAS or mobile phones, addition, deletion or interworking with a different PAN are all performed based on the ad-hoc concept.

The mobile ad-hoc concept can be also applied for construction of home networking with information devices at home by using a wireless connection technique.

In addition, the mobile ad-hoc network can be also applied for a sensor network in that sensors are installed in a dangerous area or in an area considered to be difficult to approach and constructed as a mobile ad-hoc network for exchanging information therebetween.

FIG. 1A illustrates the structure of the mobile ad-hoc network and FIG. 1B illustrates the structure of the infrastructure network.

As noted in FIGS. 1A and 1B, the mobile ad-hoc network has a relative concept to the infrastructure network which requires centralized controlling.

FIG. 2 illustrates an independently existing ad-hoc network and FIG. 2B illustrates an ad-hoc network interworking with the infrastructure network.

The mobile ad-hoc network can exist in a stand-alone form over the infrastructure network as shown in FIG. 2A or can exist in a form interworking with the infrastructure network by a gateway.

The mobile ad-hoc network uses an air interface for communication between terminals. Compared to a fixed line interface method, the air interface method has such characteristics that a transmission bandwidth is small. Because the air interface method uses a frequency with a limited band, a transmission rate of data transmitted through the band is limited. Also, since a plurality of terminals share the band, the more the number of terminals increases, the more a transmission bandwidth that each terminal can use in average is reduced. In addition, the air interface method has a limited transmission distance. Since the data transmission rate is lowered as the radio transmission distance gets away, the transmission distance is limited to maintain a suitable transmission rate.

In order to resolve the limitation, the mobile ad-hoc network extends a data transfer coverage by using a multi-hop method.

Terminals constituting the mobile ad-hoc network have mobility, so a topology of the network is dynamically changed over time. The terminal mobility includes entering of a new terminal into a network, movement of a terminal in a network and movement of the terminal out of the network, and power ON/OFF of the terminal in the network affects a change of a topology.

Each terminal has a limited radio transmission distance. Thus, as terminals are moved, a set of neighboring terminals that each terminal can directly communicate is also changed. Each terminal broadcasts its existence periodically and maintains information of neighboring terminals that each terminal can directly communicate. And each terminal updates route information according to information of a neighboring terminal. The route information is generated and managed by a routing protocol and the routing protocol can be divided into a proactive method and a reactive method.

In the proactive routing protocol, all terminals maintain fresh route information (the latest route information), and when the route information is changed periodically or network topology changes, the route information is broadcast to all terminals. With the latest route information maintaining, the proactive routing protocol can transfer data through an optimal route always without delay when traffic is generated, but a control message for managing the route information assumes massive proportions.

The reactive routing protocol is a method for searching a route at a point where traffic is generated, which solves the problem of the control message overhead of the proactive routing protocol. Generally, the reactive routing protocol processes route information managed by a terminal to be soft. Namely, when traffic is not transferred during a certain time in the route maintaining information, a terminal deletes the corresponding route information from a routing table. In the reactive method, a delay can be made according to route searching. Thus, the reactive method is more focused on minimizing route search time than searching an optimal route.

Most terminals constituting the mobile ad-hoc network use a limited capacity of battery as an energy source in order to support their mobility. According to circumstances, energy can be stably supplied temporarily when a terminal is mounted in a car or energy can be supplied continuously with a fixed unit. The limitation of energy much affects designing of the routing protocol. For example, if a terminal with a low energy level routes much traffic, remaining battery capacity of the terminal would be gradually reduced and the terminal could not use every route going through the terminal in the end. Thus, each terminal should select a route in consideration of its energy state for a stable data transmission. The energy restriction can cause a unidirectional transmission state of a link. Because a wireless transmission distance of a terminal with much energy is long, transmission from the terminal with much (or more) energy to a terminal with little (or less) energy can be possibly made, but the opposite case is not.

The energy restriction can cause a unidirectional problem in communication between two nodes. Because a wireless transmission of a terminal with much energy can reach farther than a terminal with less energy can did, transmission from the terminal with much (or more) energy to a terminal with little (or less) energy can be possibly made, but the opposite case is not.

Referring to security, the mobile ad-hoc network is exposed in a more dangerous condition compared to the general wired networks, because it uses air interface. In addition, in the mobile ad-hoc network, terminals are insecure with each other in their identity, and in case of routing by the multi-hop method, a security problem arises with respect to data by an intermediate terminal. In case of the control message of the routing protocol, because it is broadcast, its security is more serious than traffic.

SUMMARY OF THE INVENTION

Therefore, an object of the present invention is to provide a mobile ad-hoc network system having a central control means for controlling and managing an ad-hoc network and its operating method.

To achieve at least the above objects in whole or in parts, there is provided a mobile ad-hoc network system including: a plurality of mobile terminals; and a central control means for creating a entire network map by collecting identifiers and state information of the mobile terminals and setting a transmission route among terminals based on the created map.

To achieve at least these advantages in whole or in parts, there is further provided a data transmission method of the mobile ad-hoc network system including: requesting route information from a central control means when data is generated to be transmitted in a terminal; transmitting the route information of the central control means to the terminal; and transmitting the data of the terminal to a destination according to the route information.

The data transmission method of the mobile ad-hoc network system further includes registering information of a new terminal with the central control means and updating route information of each terminal set in the central control means when the new terminal enters a network area.

To achieve at least these advantages in whole or in parts, there is further provided a data transmission method of a terminal of a mobile ad-hoc network system including: requesting a central control means to send route information to a destination when data is generated to be transmitted; and receiving corresponding route information from the central control means and transmitting the generated data according to the received route information.

When the terminal enters a network area, the data transmission method further includes: requesting neighbor terminal to send information on the central control means and then locating the central control means; and registering its predetermined information with the central control means.

When a new terminal is detected, the data transmission method further includes: broadcasting a certain message including its identification information; comparing information of a response message with its stored information when the response message to the certain message is received; updating the stored information with the information of the response message if the information of the response message is not the same as the stored information; and transmitting the updated information to a central control means for updating information of the central control means.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

An ad-hoc network system in accordance with the present invention includes a central control means called a quasi ad-hoc gate (QAG) in a network system.

The QAG collects information of terminals and forms a table of a network topology. In addition, the QAG creates a map for a state of every terminal of a network and the entire network. The map reduces the size of a memory and an amount of computation with respect to route information burdened by each terminal.

Preferably, the QAG includes a means for storing registration information including an identifier of each mobile terminal, state information of each mobile terminal and identifiers of neighbor terminals, and creating an entire network (path)

map by using the registration information; a means for setting and updating a transmission route among terminals based on the created map; and a means for providing route information to a mobile terminal when the mobile terminal requests the information on the path to a destination.

Preferably, the QAG further includes a means for performing transmission route reservation for a terminal that desires to perform data transmission so that terminals in a data transmission route cannot be allocated to a different path.

Preferably, the QAG further includes a means for providing a security key to a terminal requesting high level security in order to maintain security of a network.

Preferably, the QAG further includes a multi-MAC protocol means for enabling mobile terminals based on IEEE802.11, Hyper LAN, Bluetooth, Home RF, WPAN and cellular mobile communication to be wirelessly connected.

Preferably, the QAG further includes an access means for supporting connection of an arbitrary terminal with the infra network or a GPRS (General Packet Radio Service).

The ad-hoc network system in accordance with the present invention reduces a processing overhead and a control traffic amount of each terminal with a help of the QAG.

A preferred embodiment of the present invention will now be described with reference to the accompanying drawings.

Figure 1A:
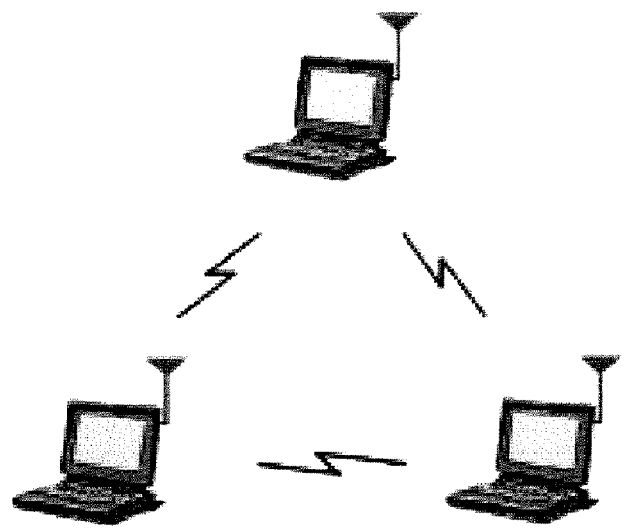
FIG. 1A illustrates the structure of a mobile ad-hoc network.
Figure 1B:
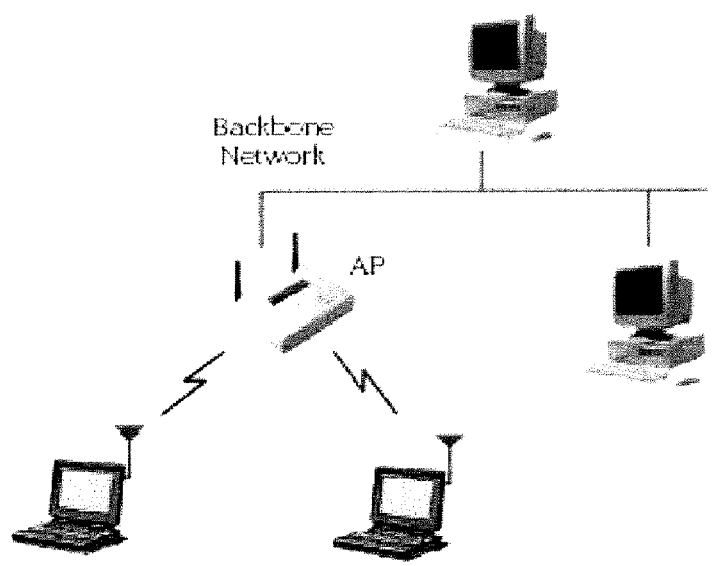
FIG. 1B illustrates the structure of an infrastructure network.
Figure 2A:
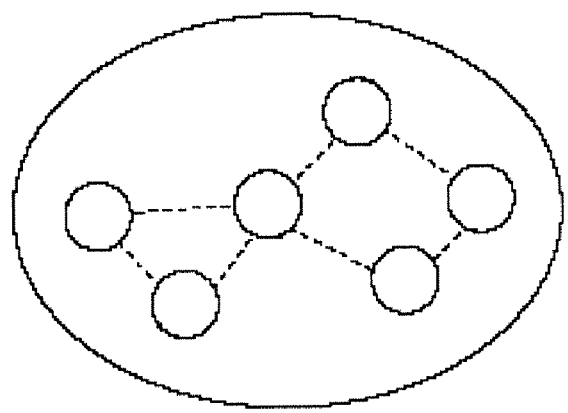
FIG. 2A illustrates the structure of an independently existing ad-hoc network.
Figure 2B:
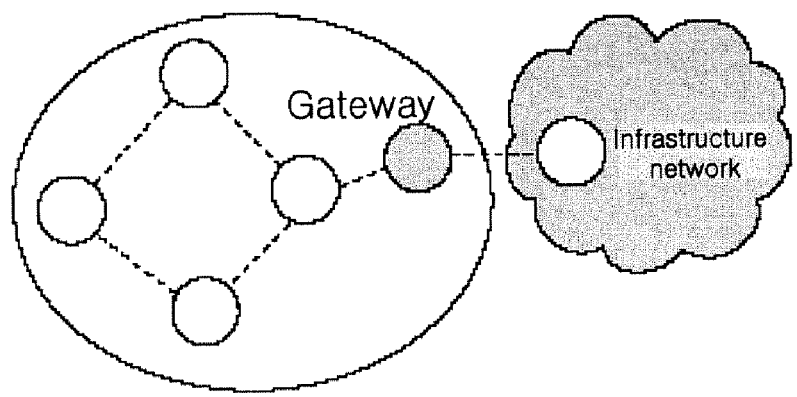
FIG. 2B illustrates the structure of the ad-hoc network interworking with the infrastructure network.
Figure 3:
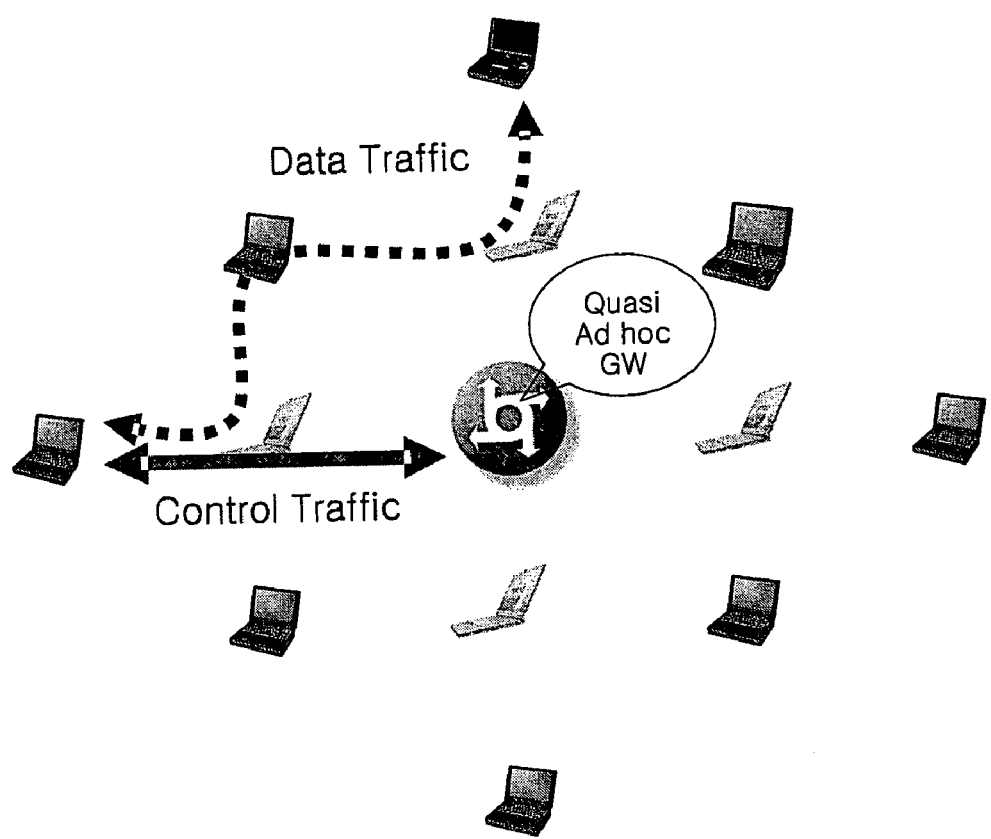
FIG. 3 illustrates the structure of an ad-hoc network in accordance with the present invention.

FIG. 3 illustrates the structure of an ad-hoc network in accordance with the present invention.

With reference to FIG. 3, a structure of the ad-hoc network system of the present invention will be described as follows.

The ad-hoc network system includes a plurality of terminals and a QAG.

Each terminal includes a registration request function of registering certain information such as its identifier (e.g., Internet protocol (IP) address), battery charge state information and an identifier (e.g., IP address) of a neighbor terminal for the QAG, a path setting request function of requesting an optimal path to a destination terminal from the QAG when transmission data is generated, and a data transmission/reception function (this function is also provided by the existing ad-hoc network).

The QAG includes a terminal registration function of storing various types of state information of terminals (an IP address of a terminal which has requested registration, battery state information and an IP address of a neighbor terminal of the terminal) and a map creation function of creating an entire network (path) map by combing lists of neighbor terminals stored in registered terminals.

In addition, the QAG includes a data exchange support function, so when the terminal requests information on a transmission route in order to transmit data, the QAG obtains one (or more) optimal path based on the entire path map and provides it to the terminal.

The QAG calculates a link cost among terminals with reference to the registration information of each terminal and creates the entire network (path) map by using the calculated link cost. And, whenever the registration information of the terminals is updated, the QAG newly creates the entire path map.

The QAG constructed as described above has the following characteristics.

A. Routing

A mobile ad-hoc network work group of an Internet Engineering Task Force (IETF) has developed some ad-hoc routing protocols including a DSDV (Destination Sequenced Distance Vector routing), an AODV (Ad hoc On-demand Distance Vector routing), a DSR (Dynamic Source Routing), a TORA (Temporally Ordered Routing Algorithm) and an ABR (Associativity Based Routing). Those protocols are categorized into two groups, proactive (table-driven) routing and reactive (on-demand) routing.

As for the table-driven routing protocols, all mobile terminals have the fresh route information and broadcast the route information to all mobile terminals periodically or when network topology changes. The main drawback of the table-driven routing protocols is that terminals continuously generate too much signaling traffic to maintain the fresh route information in each terminal.

Meanwhile, with the on-demand routing protocols, mobile terminal will search the route to a destination when the mobile terminal has data to be transmitted. The drawbacks of the on-demand routing protocols are long delay of route discovery and non-optimal route to the destination.

The two protocols, table-driven routing and on-demand routing, obtain the route information by simply checking existence of terminals, so they are not advantageous in that the route setting does not reflect a battery state of each terminal or the like.

Figure 4:
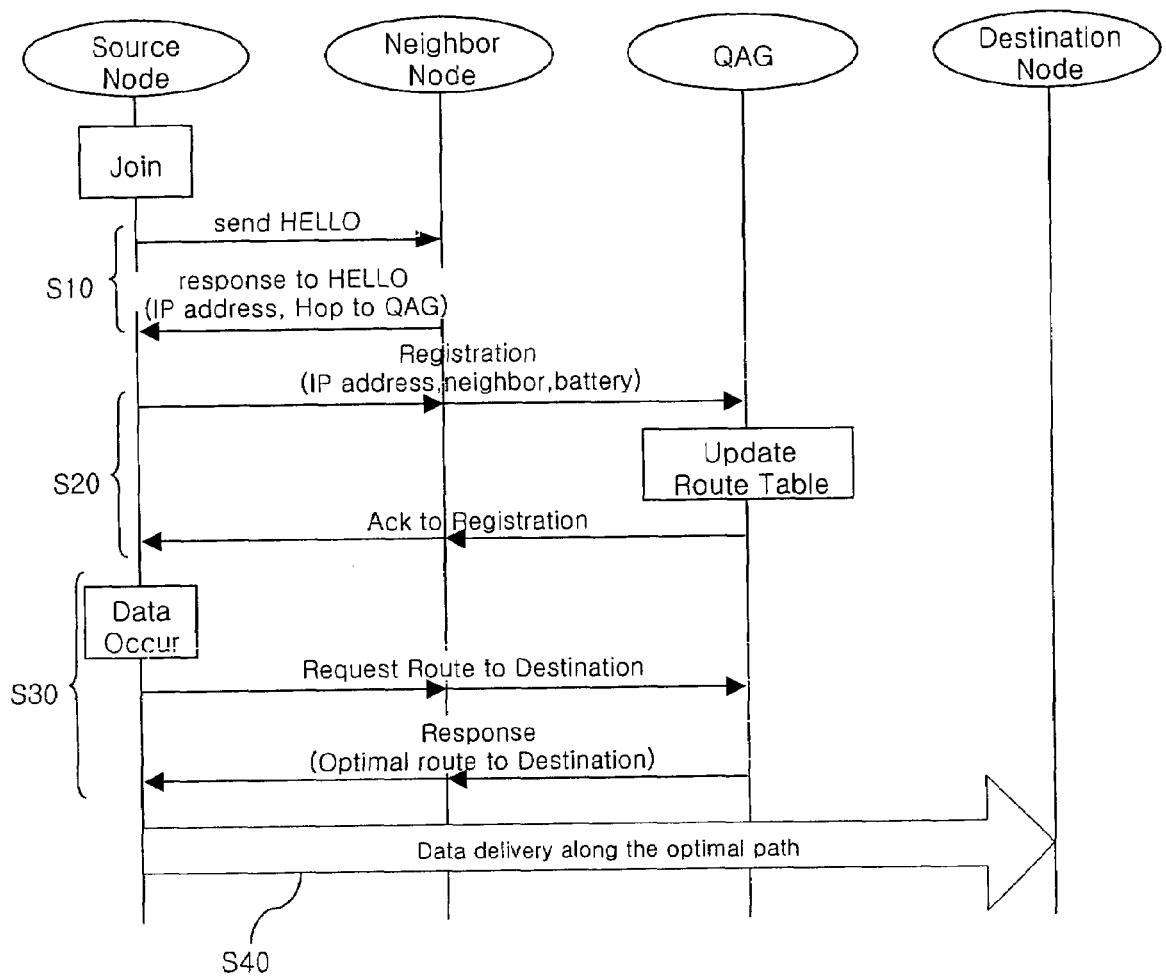
FIG. 4 illustrates an example of a basic operation of an ad-hoc network system in accordance with the present invention.

FIG. 4 illustrates an example of a basic operation of an ad-hoc network system in accordance with the present invention.

The operation of the ad-hoc network system will now be described with reference to FIG. 4.

When a new terminal (or a source node) enters the mobile ad-hoc network area, the terminal (the source node) detects existence of a QAG and a distance (the number of hops) by requesting information on the QAG from a neighbor terminal (step S10). And the source node transmits a registration request signal to the QAG. Upon receiving the registration request signal, the QAG registers the source node for a routing table and updates the entire path map to reflect the registered information. And then, the source node returns a registration completion signal (step S20).

Thereafter, when the source node that has been registered for the ad-hoc network desires to transmit data, it requests route information from the QAG. Then, the QAG generates optimum route information based on the entire path map in response to the request and transmits the generated information to the source node (step S30). Upon receiving the route information, the source node transmits data through a set path included in the route information (step S40).

The route information is a list of IP addresses of terminals. When the source node requests the route information from the QAG, it can request a QoS level and a security level selectively.

As afore-mentioned, in the ad-hoc network system, the QAG manages the routing table and transmits an optimal route information when the terminal requests a route to a destination. The ad-hoc network system has a smaller overhead with respect to the route updating than in the table-driving technique and obtains the optimal route faster than in the on-demand technique.

Figure 6:
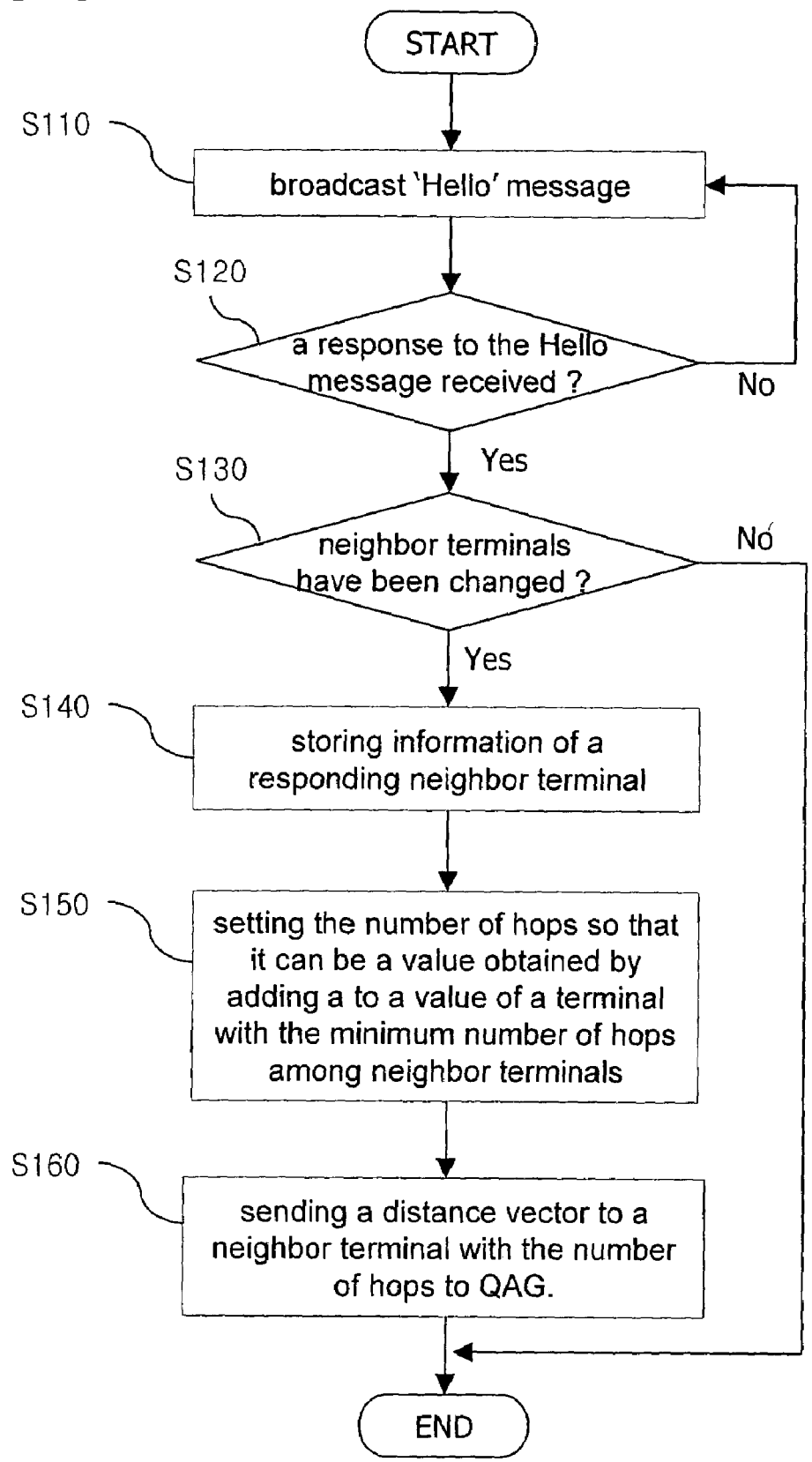
FIG. 6 illustrates a procedure for registering a terminal.

FIG. 6 illustrates a procedure for registering a terminal and updating registration information, showing that a terminal checks a change in a state of adjacent (neighbor) terminals periodically.

In the present invention, when a terminal (e.g., terminal 'A') discovers a new terminal around, the terminal 'A' broadcasts a HELLO message for informing about itself (step S110). In this case, the HELLO message includes an identifier (e.g., IP address) and information on a distance (e.g., the number of hops, an allowable bandwidth and a delay time) to the QAG. If the new terminal has not been registered for the QAG, a maximum distance to the QAG is set as a distance to the new terminal.

If the terminal 'A' fails to receive a response message to the HELLO message within a predetermined time, the terminal 'A' broadcasts the HELLO message again. A response to the HELLO message includes an identifier of the corresponding neighbor terminal and information indicating a distance to the QAG.

When a response to the HELLO message is received and if information of the response message is not different from information on neighbor terminals stored in the terminal 'A', the terminal 'A' waits for a certain time and then sends the HELLO message to the neighbor terminals again. If, however, the received information of the neighbor terminals is different from the information on the neighbor information stored in the terminal 'A' (step S130), the terminal 'A' updates the stored information with the received information (step S140) and sets the shortest distance (MIN{(terminal 'A'-terminal 'B'-QAG), (terminal 'A'-terminal 'C'-QAG), (terminal 'A'-terminal 'D'-QAG)}) among distances from the terminal 'A' to the QAG by way of respective neighbor terminals (e.g., terminals 'B', 'C' and 'D') (step S150).

When information updating is completed, the terminal 'A' transmits updated information (i.e., identifiers of neighbor terminals and the newly changed information on the distance to the QAG) to the QAG. In this case, the update information is transferred to the QAG through the neighbor terminal with the minimum distance information (step S160).

Figure 7:
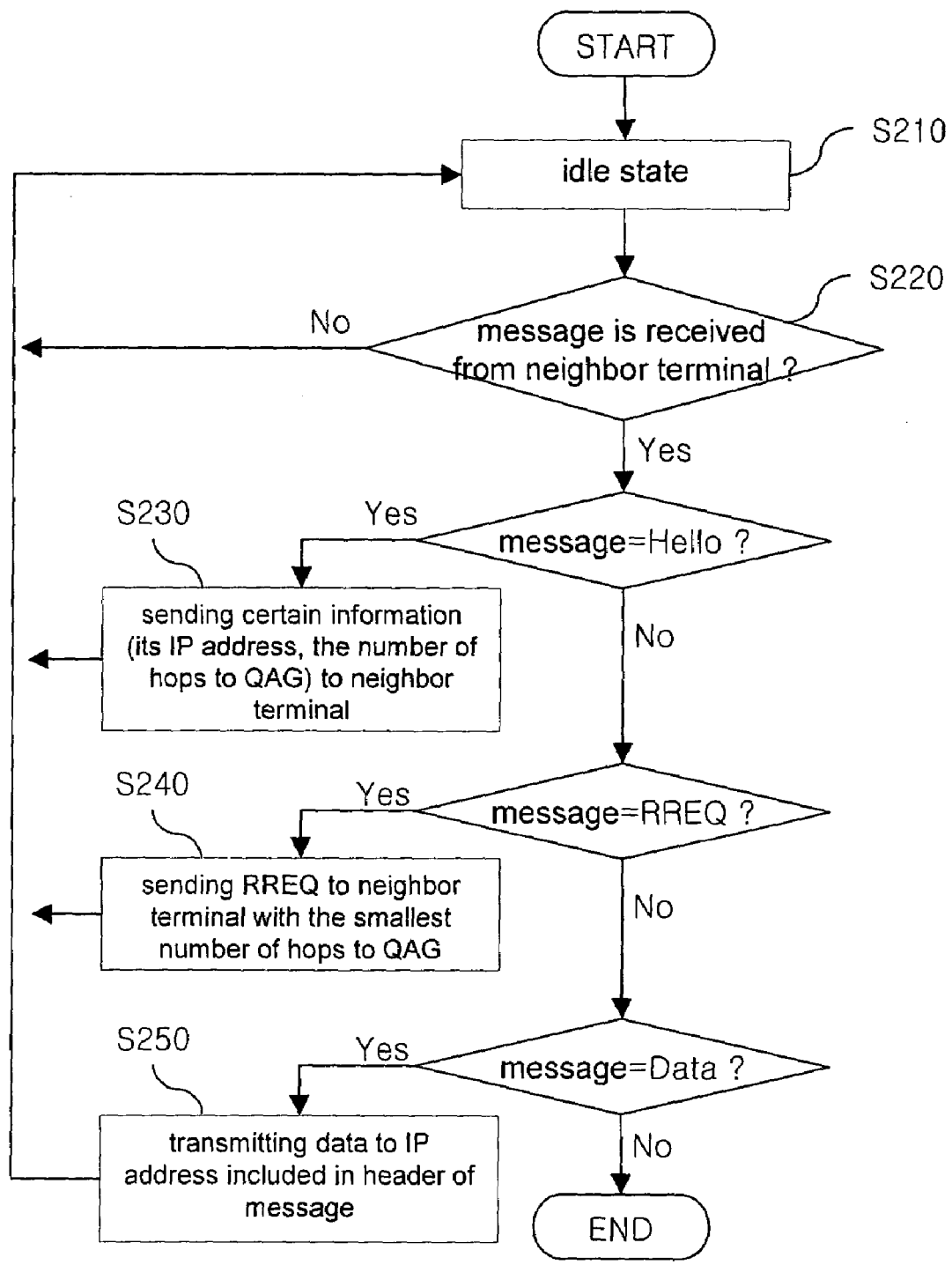
FIG. 7 illustrates an example of a procedure for processing a message of the terminal.

FIG. 7 illustrates an example of a procedure for processing a message of the terminal, showing that the terminal 'A', which has completed the registration for the QAG, processes a message received from the neighbor terminal.

Three types of messages are transmitted between the terminal and the neighbor terminals, including the message (HELLO) for checking a change in the state of neighbor terminals, a message (RREQ) for requesting setting of a transmission route of data and a message for transmitting actual data.

Once the terminal 'A' finishes registration for the QAG, it waits for receiving of a message in an idle state (step S210).

When a message is received from a neighbor terminal, the terminal 'A' checks a message type field to discriminate whether the received message is the HELLO, the RREQ (Route REQuest) or the data transmission message (step S220).

If the received message is the HELLO message, the terminal 'A' returns a response message. The response message includes an identifier of a responding terminal and information on a distance from the responding terminal to the QAG (step S230).

If the received message is the RREQ message, the terminal 'A' transmits the RREQ message to a terminal closest to the QAG (step S240), and the RREQ message is finally delivered to QAG.

If the received message is the data transmission message, the terminal 'A' transfers the message to an IP address included in a header of the data. If a destination indicated in the IP address is the terminal 'A' itself, the terminal 'A' detects data from the received message (step S250).

B. QoS Signaling

IntServ and DiffServ are QoS signaling method designed for guaranteeing a QoS of traffic in the Internet. However, it seems to be difficult to reuse those mechanisms in the ad-hoc network because of mobility and limited bandwidth.

In the present invention, in order to guarantee a QoS of traffic in the ad-hoc network, the QAG has a radio resource reservation function so that a specific terminal can reserve a data transmission route. Once a terminal is reserved for a path, the terminal cannot be allocated for a different path. Such path reservation is possible because the QAG can manage all paths of the network.

The terminal can request the QAG to guarantee the QoS of transmission data selectively.

C. Interworking with Infrastructure Network

Services the ad-hoc network system can provide is very limited yet, so it is quite important to allow a terminal to use Internet services through the infrastructure network. In the present invention, the ad-hoc network system allows the QAG to be connected with the infrastructure network such as the global Internet, Intranet or the GPRS to provide various services of the infrastructure network to the terminal. At the side of the infrastructure network, consideration of the QAG having a connection with the infrastructure network is favored in the aspect of expanding a service area of the infrastructure network.

D. Security

Without the infrastructure for central controlling, the ad-hoc network can hardly have a security algorithm. However, the ad-hoc network system of the present invention includes the QAG and the QAG manages a security key, so that the ad-hoc network system can serve as a reliable central administration node. To maintain security of the network, the QAG provides the security key to the terminal that requires high level of security.

Thanks to the security function of the QAG, users can communicate in the ad-hoc network more stably and reliably.

E. Integrating Heterogeneous Networks

Wireless access technologies include an IEEE802.11, a Hyper LAN, an IrDA (Infra red Data Association), a Bluetooth, a Home RF, a WPAN (Wireless Personal Area Network), cellular mobile communication and the like. If terminals use different wireless access technologies, they cannot communicate with each other without a terminal having multiple MAC protocols. In the present invention, the ad-hoc network system allows the QAG to have a multiple MAC protocols so as to be connected with various networks (the IEEE802.11, the Hyper LAN, the IrDA (Infra red Data Association), the Bluetooth, the Home RF, the WPAN (Wireless Personal Area Network) and cellular mobile communication) using different wireless access technologies.

F. Application Scenario of the QAG

The central control means such as the QAG shall reside in an equipment that has less mobility than terminals and has abundant electric power. Thus, if the ad-hoc network is used for a military purpose, the QAG can reside in a tank or a truck. In case of home networking, the QAG can reside in a refrigerator or a television. If the ad-hoc network is used for passengers, the QAG can reside in a subway train or a bus.

Figure 5:
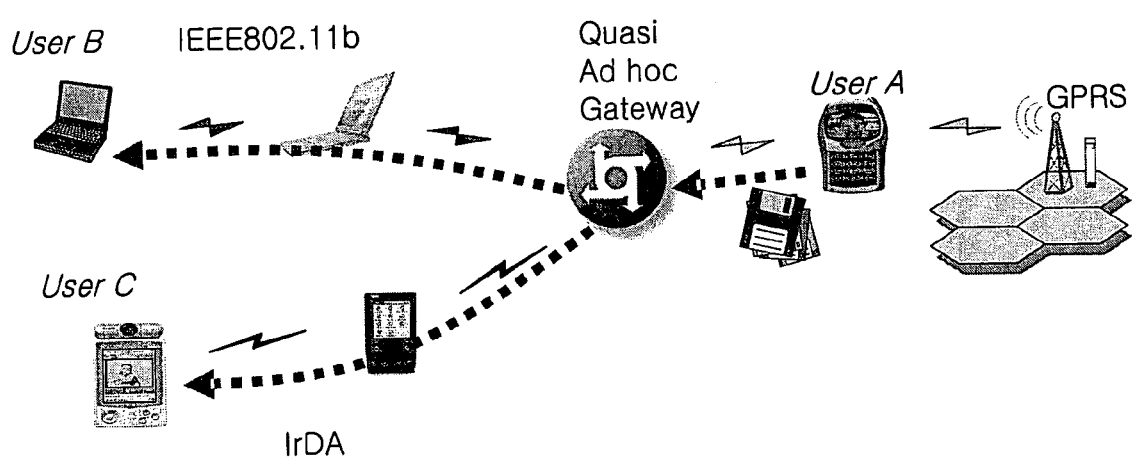
FIG. 5 illustrates a file transmission scenario of the ad-hoc network in accordance with the present invention.

FIG. 5 illustrates a file transmission scenario of the ad-hoc network in accordance with the present invention.

It is assumed that a user 'A' having a 3G GPRS cellular phone wants to send a file, which has been downloaded from the GPRS, to users 'B' and 'C' each having a laptop of IEEE802.11b and IrDA protocols in a subway train.

First, the user 'A' finds a QAG in the subway train and acquires routes to the users 'B' and 'C'. If the file transfer needs high level security, the QAG distributes the security key to the users 'A', 'B' and 'C'. Finally, the file is delivered to the users 'B' and 'C' via the optimized paths assigned by the QAG.

As noted from the simple scenario, the ad-hoc network of the present invention can expand the GPRS coverage by the support of the QAG.

As so far described, the ad-hoc network system of the present invention can overcome the limitation of the related art ad-hoc network by including the central control means such as the QAG and provide a network service with high quality and stability to each terminal.

Advantages of the network operating method of the present invention will now be described by comparing the proactive (table-driven) routing method and the reactive (on-demand) routing method.

Compared to the proactive routing, the present invention has the small number of broadcasting messages for updating route information. In addition, each terminal manages only information on neighbor terminals and information on the QAG, a memory size and calculation amount of the terminal can be reduced and a battery power consumption can be also reduced. This can be possible because only a terminal whose neighbor terminal is changed updates information.

Compared to the reactive routing, data is transmitted through an optimized route. Namely, in the reactive routing, a route that receives a response within the shortest time is used as a data transmission route, but in the present invention, a route that the QAG determines is used as an optimal route. In addition, compared with the reactive routing in which a message for requesting a route is transmitted to the entire network, in the present invention, when a terminal transmits the route requesting message, the message is transmitted only to terminals connected to the QAG, so that overhead affecting the entire network can be relatively small.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile ad-hoc network system comprising:
   a plurality of mobile terminals and a central control means configured to create a network map by registering identifiers and state information of the mobile terminals and setting transmission routes among the terminals based on the created network map, wherein the central control means comprises:
   a means for storing registration information including, for each of the mobile terminals, an identifier, state information and identifiers of neighbor terminals, and for creating the network map by using the registration information;
   a means for setting and updating the transmission routes among the terminals based on the created map; and
   a means for providing route information to a mobile terminal when the mobile terminal requests the route information for transmitting data to a destination; and
   wherein each terminal comprises:
   a means for storing information including identifiers of its neighbor terminals and distance information indicating a distance from the terminal to the central control means;
   a means for transmitting a broadcast message including an identifier of the terminal and the distance information stored therein;
   a means for receiving a response message including an identifier of the responding terminal and distance information indicating a distance from the responding terminal to the central control means;
   a means for updating the information on the neighbor terminals stored in the terminal and setting a smallest value of the values obtained by respectively adding the distance information of the neighbor terminals to the distance from the terminal to the neighbor terminals as the updated distance information of the terminal, when the received response message is different from the stored information; and
   a means for transmitting the updated information to the central control means to be registered, when the terminal enters a network area of the mobile ad-hoc network.

2. The system of claim 1, wherein the network map calculates a link cost among terminals by using the registration information, and wherein the network map is created based on the calculated link cost.

3. The system of claim 1, wherein the central control means further comprises: a means for performing transmission route reservation for a terminal that wants to perform data transmission so that terminals in a data transmission route cannot be allocated to a different path.

4. The system of claim 1, wherein the central control means further comprises: a means for providing a security key to a terminal requesting high level security in order to maintain security of a network.

5. The system of claim 1, wherein the central control means further comprises: a multi-MAC protocol means for enabling mobile terminals based on at least one of IEEE802.11, Hyper LAN, Bluetooth, Home RF, WPAN and cellular mobile communication to be wirelessly connected.

6. The system of claim 1, wherein the central control means further comprises: an access means for supporting connection of an arbitrary terminal with the infra network or a GPRS (General Packet Radio Service).

7. A data transmission method for a mobile ad-hoc network system comprising a plurality of terminals and a central control means, each terminal storing information including identifiers of neighbor terminals and distance information indicating a distance from the terminal to the central control means, said method comprising:
   transmitting, by mobile terminal, a broadcast message including an identifier of the terminal and the distance information thereof;
   receiving, by the mobile terminal, a response message including an identifier of a responding terminal and distance information indicating a distance from the responding terminal to the central control means;
   wherein if the received response message is different from the information on the neighbor terminals stored in the mobile terminal, updating, by the mobile terminal, stored information therein with the received response message, and setting, by the mobile terminal, a smallest value of the values obtained by respectively adding the distance information of the neighbor terminals to the distance from the mobile entering terminal to the neighbor terminals as the updated distance information of the mobile terminal;
   transmitting, by the mobile terminal, the updated information to the central control means to be registered;
   requesting, by the mobile terminal, from the central control means, route information, when the mobile terminal generates data to be transmitted;
   transmitting, by the central control means, the requested route information to the mobile terminal;
   transmitting, by the mobile terminal, the generated data to a destination according to the received route information;

registering information of a new mobile terminal with the central control means;

and updating route information of each terminal set in the central control means when the new terminal enters a network area, wherein the registration information comprises an identifier of the new mobile terminal, state information of the new mobile terminal, and a list of identifiers of neighbor terminals of the new mobile terminal.

8. The method of claim 7, wherein the state information of the terminal includes a battery charge state information.

9. The method of claim 7, wherein the central control means calculates a link cost among terminals based on registration information of terminals, and creates a network map based on the calculated link cost.

10. The method of claim 9, wherein the central control means generates route information to the destination based on the network map and provides the route information to the mobile terminal, when the mobile terminal requests a route to a destination.

11. The method of claim 7, wherein the route information includes a list of IP address of the neighbor terminals.

12. The method of claim 7, wherein the mobile terminal requests a QoS level or a security level selectively, when the mobile terminal requests the route information from the central control means.

13. The method of claim 7, wherein the mobile terminal broadcasts the message after the lapse of predetermined time, if information of the response message comprises the stored information therein.

14. The method of claim 7, wherein the mobile terminal broadcasts the message again, if the mobile terminal fails to receive a response message to the message within a predetermined time.

15. The method of claim 7, wherein if the mobile terminal is a non-registered terminal, a maximum value of a distance to the central control means is set as a distance to the non-registered terminal.

\* \* \* \* \*